United States Patent [19]

Hayami et al.

[11] Patent Number: 5,635,953
[45] Date of Patent: Jun. 3, 1997

[54] MAP DISPLAYING APPARATUS

[75] Inventors: Katsuro Hayami; Kazuhiro Yokouchi; Hirofumi Goto; Chisato Yoshida; Yasushi Fujii, all of Hyogo, Japan

[73] Assignee: Mitsubishi Denki Kabushiki Kaisha, Tokyo, Japan

[21] Appl. No.: 384,599

[22] Filed: Feb. 3, 1995

Related U.S. Application Data

[63] Continuation of Ser. No. 144,545, Nov. 1, 1993, abandoned, which is a continuation of Ser. No. 894,592, Jun. 5, 1992, abandoned.

[30] Foreign Application Priority Data

Jul. 11, 1991 [JP] Japan .................... 3-170881

[51] Int. Cl.$^6$ .......................... G08G 1/123
[52] U.S. Cl. ............... 345/146; 340/990; 340/995
[58] Field of Search ................... 340/712, 723, 340/990, 995, 525; 379/45; 364/443; 395/161; 345/173, 146, 113, 115, 133

[56] References Cited

U.S. PATENT DOCUMENTS

| | | | |
|---|---|---|---|
| 4,698,625 | 10/1987 | McCaskill | 340/723 |
| 4,737,916 | 4/1988 | Ogawa | 340/990 |
| 4,862,390 | 8/1989 | Weiner | 345/146 |
| 4,974,170 | 11/1990 | Bouve et al. | 395/161 |
| 4,992,947 | 2/1991 | Nimura et al. | 340/990 |
| 5,109,399 | 4/1992 | Thompson | 379/45 |
| 5,148,522 | 9/1992 | Okazaki | 345/173 |

FOREIGN PATENT DOCUMENTS

| | | |
|---|---|---|
| 59-121437 | 7/1984 | Japan . |
| 1-119898 | 5/1989 | Japan . |
| 2-187898 | 7/1990 | Japan . |
| 3-76000 | 3/1991 | Japan . |
| 1141499 | 6/1991 | Japan . |

*Primary Examiner*—Richard Hjerpe
*Assistant Examiner*—Kara Farnandez Stoll

[57] ABSTRACT

A map displaying apparatus for displaying a map and a destination on a display screen. A map memory stores a map data to be displayed on a displayer. A telephone number, an area code, or postal code is inputted through an inputting panel. A second memory stores information on telephone numbers and the coordinates of positions on a map corresponding to the respective telephone numbers, information on area codes and the coordinates of positions on a map corresponding to the respective area codes, and information on postal codes and the coordinates of positions on a map corresponding to the respective postal codes. A position retrieval section reads from the second memory the coordinate of a position on a map corresponding to the telephone number inputted through the inputting panel, the coordinate of positions on a map corresponding to the area code inputted through the inputting panel, the coordinate of positions on a map corresponding to the postal code inputted through the inputting panel. The position retrieval section then retrieves map data stored in the map memory according to the telephone number, area code, or postal code and displays the map on the displayer. The map region on display may be shown highlighted when the map region is specified by information such as an area code and a postal code.

4 Claims, 10 Drawing Sheets

MAP DISPLAYING APPARATUS

This application is a continuation of application Ser. No. 08/144,545 filed on Nov. 1, 1993, now abandoned, which is a continuation of application Ser. No. 07/894,592 filed on Jun. 5, 1992, now abandoned.

BACKGROUND OF THE INVENTION

1. Field of Invention

The present invention relates to a map displaying apparatus which allows an operator to input the destination of a vehicle into a map even if the operator does not know the exact location of the destination on the map.

2. Prior Art

One example of a map displaying apparatus is an on-vehicle navigation apparatus. A navigation apparatus is used for displaying both the present position and the destination of a vehicle on a map to ensure smooth running of the vehicle at night as well as in a strange town.

Figure 9:
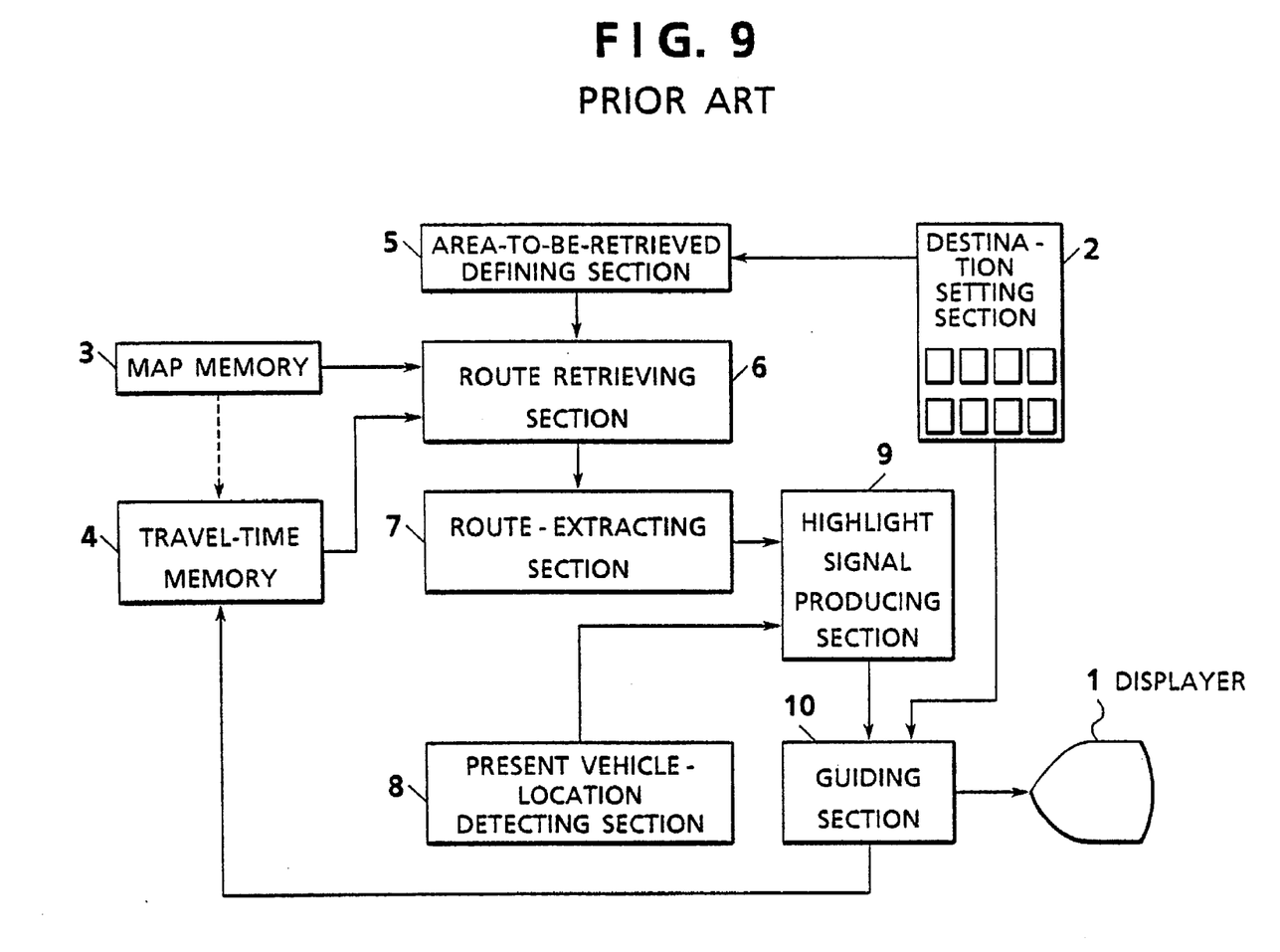
FIG. 9 is a block diagram showing a prior art navigation apparatus.

FIG. 9 is a block diagram showing a prior art navigation apparatus disclosed in Japanese Patent Preliminary Publication(KOKAI) No.1-119898. In the figure, a displayer 1 displays a map where the destination of a vehicle is specified by an operator through a destination setting section 2. A map memory 3 stores therein information on road maps and road segments that constitute the road maps. A travel-time memory 4 stores therein the time required for traveling the road segments according to months of the year, days of the week, and hours.

An area-to-be-retrieved defining section 5 calculates a point-to-point distance on a map between the present vehicle location and the destination of the vehicle, and then defines an area where a group of road segments to the destination are retrieved in accordance with the calculated point-to-point distance. A route retrieving section 6 retrieves all possible combinations of road segments for the road maps stored in the map memory 3, which possible combinations of road segments lead the operator all the way from the present vehicle location to the destination. A route-extracting section 7 extracts a minimum-travel-time route in terms of the time required for traveling respective segments, which minimum-travel-time route requires a minimum time to travel from the present vehicle location to the destination. A present vehicle location detecting section 8 calculates an accumulated azimuth and an accumulated distance resulted from the running of the vehicle to determine a calculated present vehicle location on a map. A highlight signal producing section 9 produces a signal used for highlighting both the minimum-travel-time route and the calculated present vehicle location on the displayed road map. A guiding section 10 supplies the displayers with the minimum-travel-time route and the signal for highlighting the calculated present vehicle location on the road map, and stores the time spent to actually travel the respective road segments into the travel-time memory 4.

Figure 10:
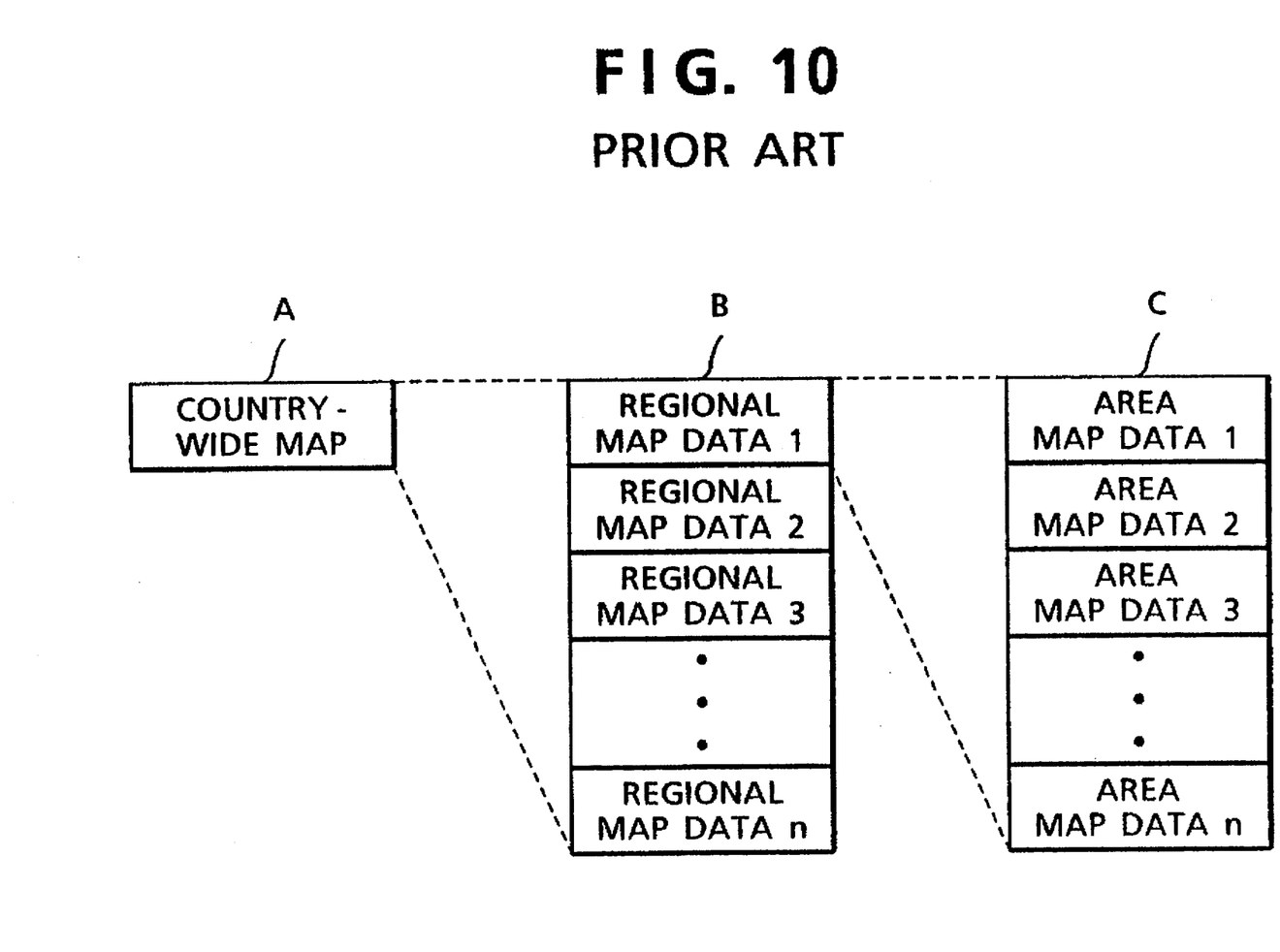
FIG. 10 shows the structure of map data stored in the map memory 3.
Figure 11:
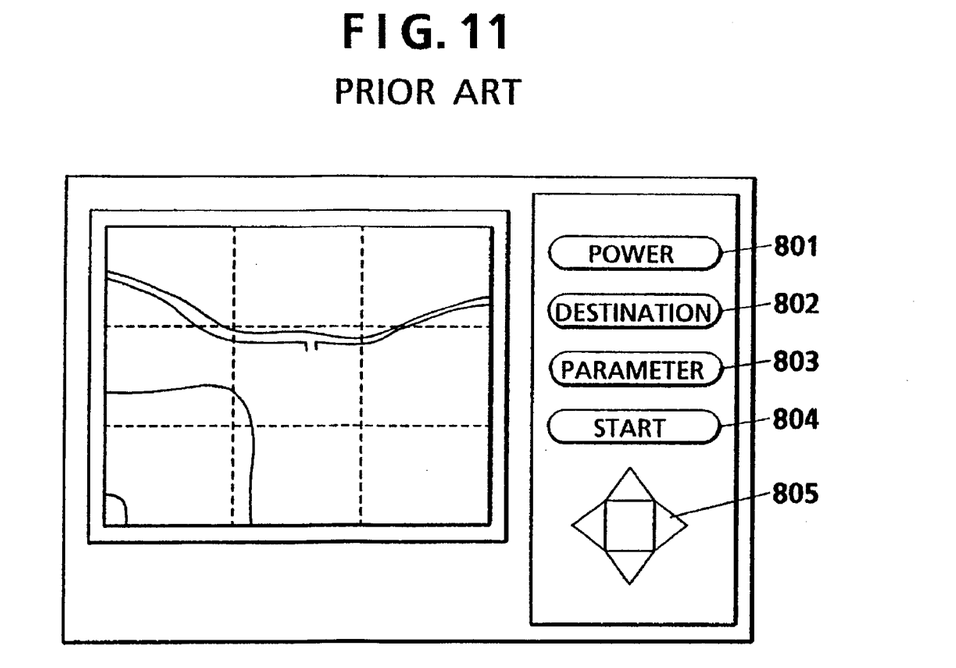
FIGS. 11 and 12 show the destination setting section 2 provided on the front panel of the displayer of a prior art on-vehicle navigation apparatus.
Figure 12:
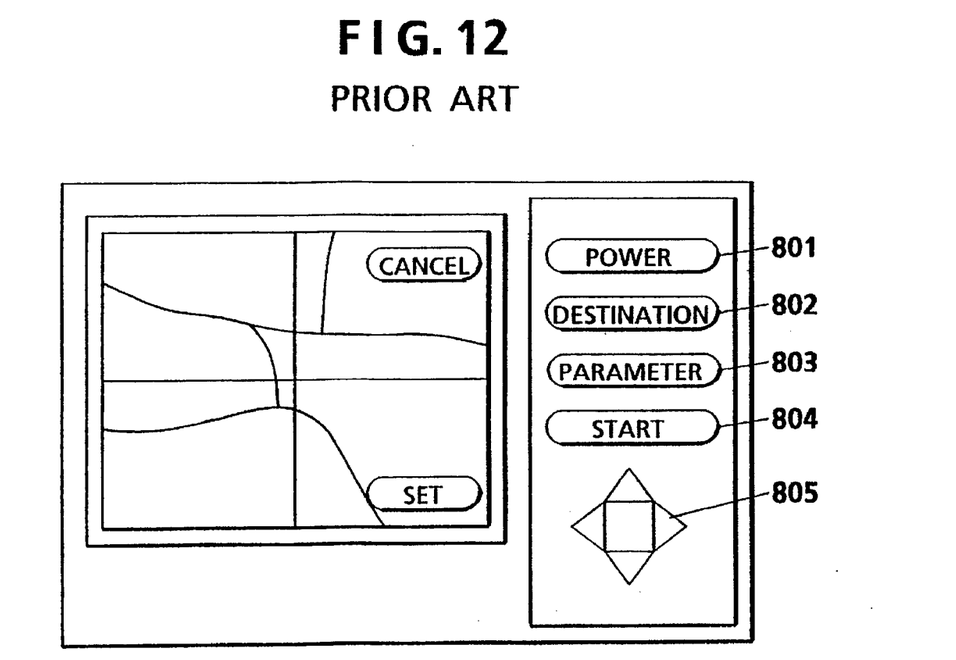

FIG. 10 shows the structure of map data stored in the map memory 3. Data A is map data on a country-wide level. Data B is map data on a regional level where the whole country is divided into a plurality of large regions. Data C is map data on a area level where each of the plurality of regional is further divided into a plurality of areas. FIGS. 11 and 12 show the destination setting section 2 provided on the front panel of the displayer 1 of a prior art on-vehicle navigation apparatus. In FIG. 11, a power key 801 is used to turn on and off the apparatus. A destination key 802 is used to set a destination and to check the destination on display. A parameter key 803 is used to set various conditions when guiding the vehicle along the routes selected. A start key 804 is used to start guiding a vehicle along the selected route. A scroll key 805 is to scroll the map displayed on the displayer 1 upwardly and downwardly as well as leftward and rightward.

The prior art on-vehicle navigation apparatus will now be described in terms of its operation when setting a destination. When the destination key 802 is pressed, an option menu, not shown, appears on the displaying screen for an operator to select either "SET" or "CHECK". Pressing "SET" brings the country-wide map, not shown, on the displaying screen and prompts the operator to select a regional map therefrom. Upon selecting a regional map, the corresponding regional map appears on the displayer 1, the sample of which being shown in FIG. 11. Upon selecting an area from the regional map on display allows an area map as shown in FIG. 12 to be displayed.

Figure 13:
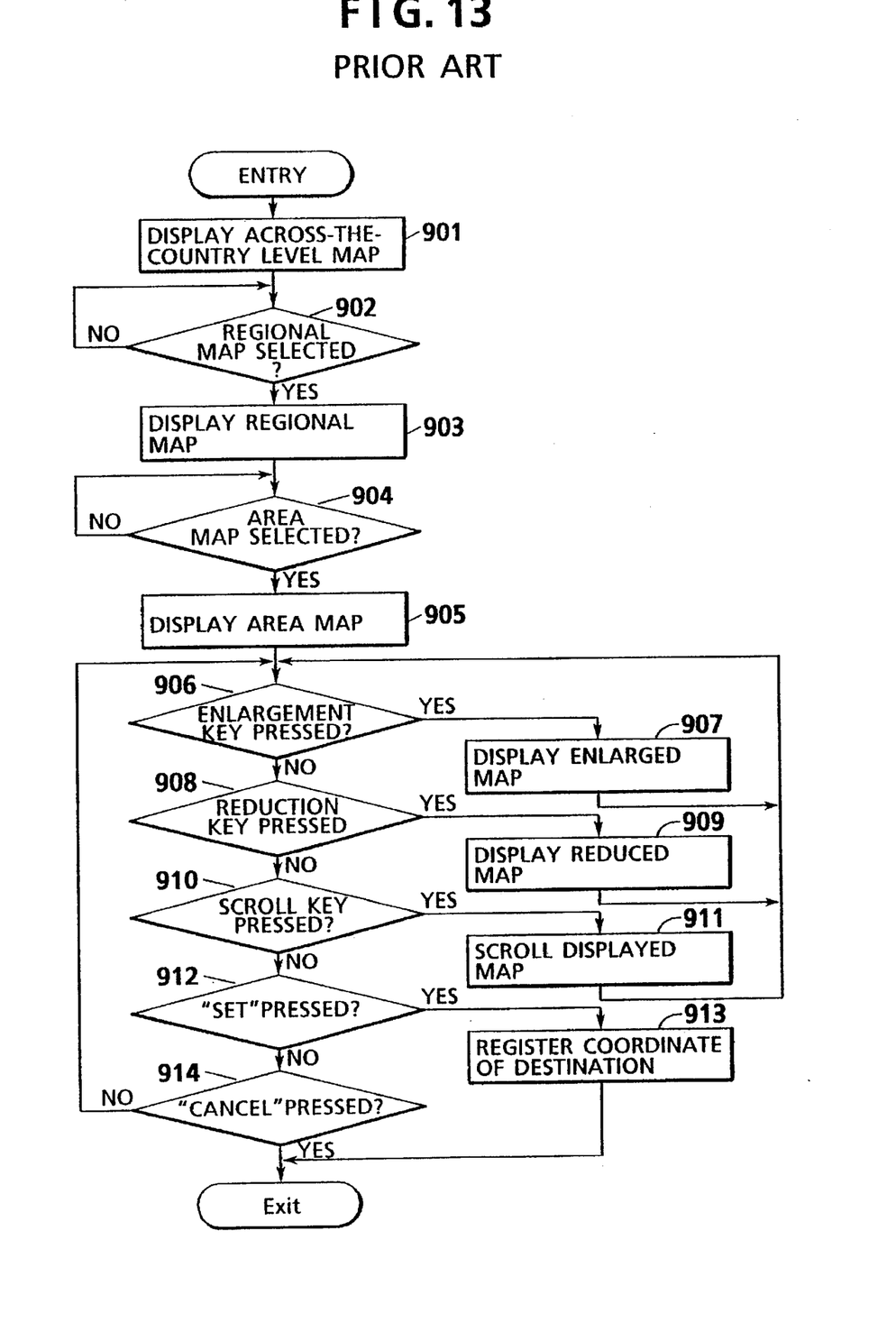
FIG. 13 is a flowchart illustrating the operation of the prior art on-vehicle navigation apparatus of FIGS. 11 and 12.

The prior art on-vehicle navigation apparatus operates in a manner illustrated by the flowchart in FIG. 13.

A country-wide map is displayed at step 901, and a check is made at step 902 to determine whether a regional map has been selected. If the result is NO at step 902, then the program iterates step 902; if YES, then the program proceeds to step 903 where the selected regional map is displayed. Then, the program proceeds to step 904 where a check is made to determine whether an area map has been selected. If the result is NO at step 904, then step 904 is repeated; if the result is YES, then the program proceeds to step 905 where the selected area map is displayed on the displayer. Thereafter, a check is made at step 906 to determine whether an enlargement key, not shown, has been pressed. If the enlargement key has been pressed, then the a detailed map is displayed at step 907 and then the program returns to step 906.

If the enlargement key has not been pressed, then the program proceeds to step 908 where a check is made to determine whether a reduction key has been pressed. If the result at step 908 is YES, the program proceeds to step 909 where a larger area map including area map displayed at step 905 is displayed and then the program returns to step 906.

If it is determined that the reduction key has not been pressed, the program proceeds to step 910 where a check is made whether the scroll key has been pressed. If the result at step 910 is NO, then the program proceeds to step 911 where the program performs scrolling of map and then returns to step 906.

If the answer is NO at step 910, the program proceeds to step 912 where a check is made to determine whether the "SET" has been pressed. If the answer is YES at step 912, the position coordinate of the center of the displayed map is registered at step 913 as the coordinate of the destination before completing the destination setting. If the answer at step 912 is NO, a check is made at step 914 to determine whether "CANCEL" has been pressed. If the answer at step 914 is YES, then the destination setting is interrupted and a series of steps for displaying a map is terminated. If the answer is NO at step 914, then the program returns to step 906 to thereby continue to determine whether any key input is made.

The above-mentioned prior art on-vehicle navigation has a drawback that an operator must know the exact location of the destination on the map. The telephone number of the destination, area codes, or postal codes are of no help.

SUMMARY OF THE INVENTION

An object of the invention is to provide a map displaying apparatus where inputting either the area code, or postal code of the destination of a vehicle brings a corresponding map on a displaying screen so that the driver can enter the destination of the vehicle on the map with a correct position coordinate.

An object of the invention is to provide a map displaying apparatus where inputting the telephone number of the destination of a vehicle brings a corresponding map on a displaying screen so that the driver can enter the destination of the vehicle on the map with a correct position coordinate.

A map memory stores map data to be displayed on a displayer. The telephone number of the destination of the vehicle, the telephone area code to which the destination belongs, or the postal code in which the destination exists is inputted through an inputting panel by an operator. A second memory stores information on telephone numbers and the coordinates of positions on a map corresponding to the respective telephone numbers, information on area codes and the coordinates of positions on a map corresponding to the respective area codes, and information on postal codes and the coordinates of positions on a map corresponding to the respective postal codes. The coordinate of a position is, for example, the lattitude and longitude of the point on a map. A position retrieval section reads from the second memory the coordinate of a position on a map corresponding to the telephone number inputted through the inputting panel, the coordinate of positions on a map corresponding to the area code inputted through the inputting panel, the coordinate of positions on a map corresponding to the postal code inputted through the inputting panel. The position retrieval section then retrieves map data stored in the map memory according to the telephone number, area code, or postal code and displays the map on the displayer. The map region on display may be shown highlighted when the map region is specified by information such as an area code and a postal code.

BRIEF DESCRIPTION OF THE DRAWINGS

Features and other objects of the invention will be more apparent from the description of the preferred embodiments with reference to the accompanying drawings in which.

DETAILED DESCRIPTION OF THE PREFERRED EMBODIMENTS

Construction

Figure 1:
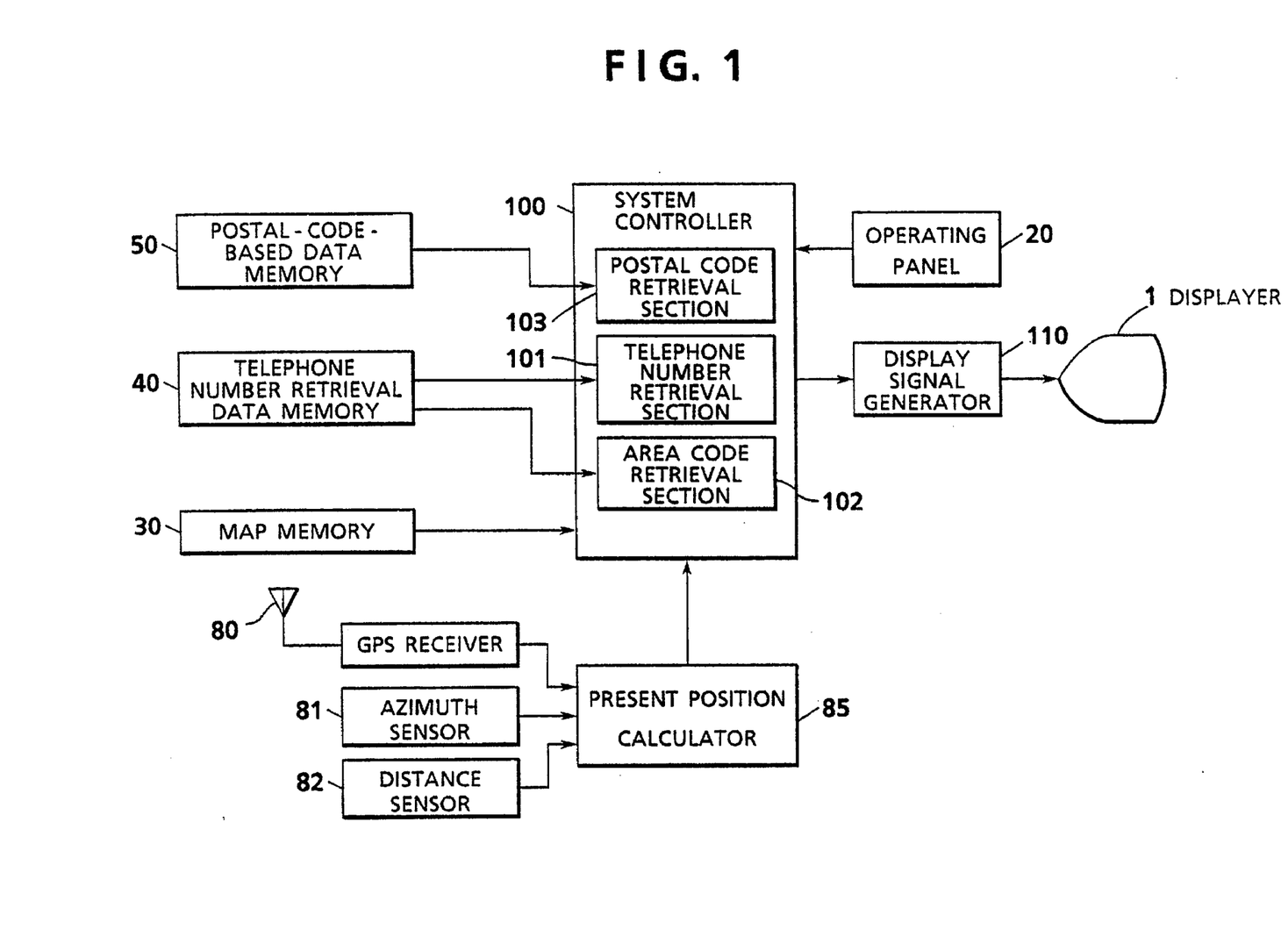
FIG. 1 is a block diagram showing an embodiment of the invention.

An embodiment of a map displaying apparatus according to the invention will now be described with reference to the drawings. FIG. 1 is a block diagram showing an embodiment of the invention. In the figure, displayer 1 displays the map of a destination inputted via an operating panel 20. The screen of this displayer 1 is of the touch screen type which permits the operator to select a desired function from a displayed option menu on the screen. The panel touch screen displays four touch input keys, i.e., a key for inputting telephone numbers, a key for inputting area codes, a key for inputting postal codes, and a key for inputting information to specify a specific map. The telephone numbers, telephone area codes, and postal codes are inputted through the touch sensitive screen. The information inputted through the operating panel 20 is directed to a system controller 100 which retrieves a map from one of memories 30, 40, and 50. The map memory 30 stores therein map data such as road networks, road segments, and information on road segments. The telephone number retrieval data memory 40 stores therein information on the inputted telephone number and the corresponding position coordinate on the map, information on the inputted area code and the corresponding position coordinate on the map, and map regions such as a city, ward, town, and county and corresponding map region and corresponding map-region-specifying information. A postal-code-based data memory 50 stores therein information on the combination of postal codes and corresponding position coordinate on the coordinate. A GPS(Global Positioning System) receiver 80 detects the present position of a vehicle. An azimuth sensor 81 detects the azimuth of the vehicle while a distance sensor 82 detects the distance through which the vehicle has traveled. A present position calculator 85 calculates the present location of the vehicle on the basis of the output data from both the azimuth sensor 81 and distance sensor 82.

The system controller 100 receives various commands from the operating panels 20 and supervises the entire operation of the apparatus. The system controller 100 stores the coordinate of the destination of a vehicle, receives the calculated present position of vehicle from the present position calculator 85, and reads the necessary map data from the map memory 30.

The system controller 100 has three data retrieval sections. A telephone number retrieval section 101 retrieves the position coordinate corresponding to an inputted telephone number. An area code retrieval section 102 retrieves a map region corresponding to an inputted area code, i.e., the coordinates of a plurality of points on the map which define a map where the inputted area code is found. A postal code retrieval section 103 retrieves a map region corresponding to an inputted postal code, i.e., the coordinates of a plurality of points on the map which define a map where the inputted area code is located.

A display signal generator 110 produces a display signal indicative of the present position of the vehicle and the destination of the vehicle on the map.

Figure 2:
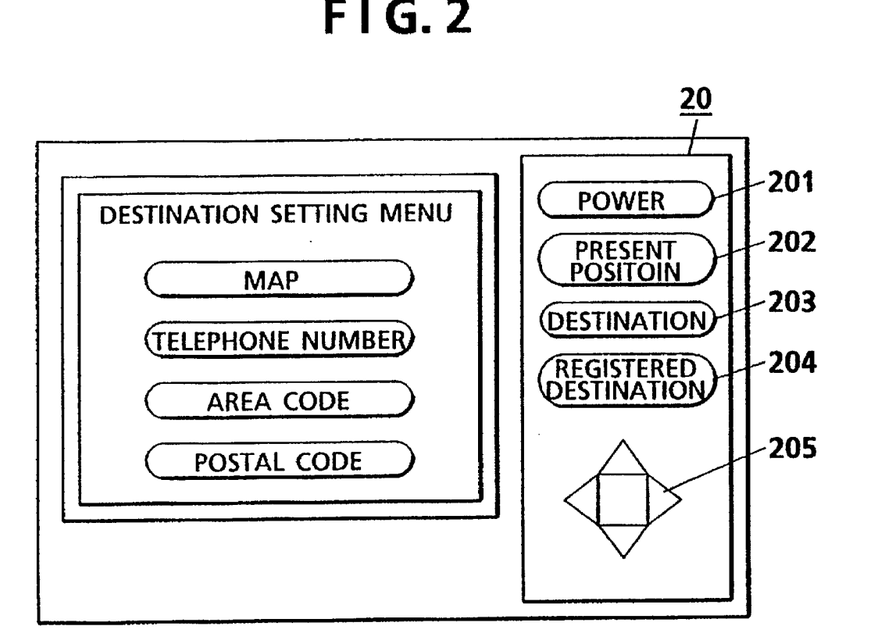
FIG. 2 shows an example of an option menu displayed on the screen of the embodiment of FIG. 1.
Figure 3:
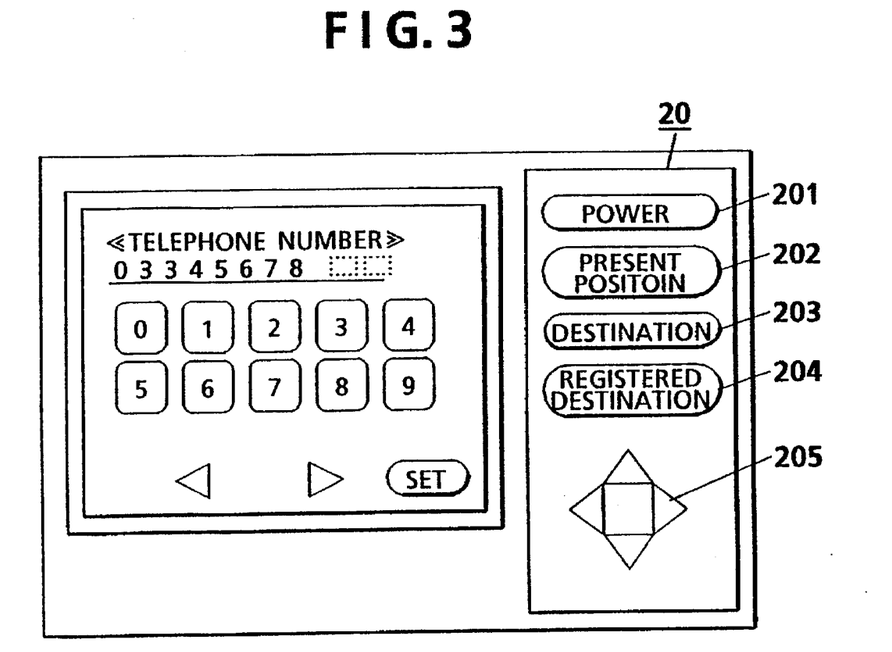
FIG. 3 shows an example of a display for setting vehicle destination in terms of a telephone number.

FIG. 2 shows an example of an option menu displayed on the screen of the embodiment of FIG. 1 as well as various function keys on the operating panel 20. FIG. 3 shows an example of display when setting a vehicle destination in terms of a telephone number. The telephone number is inputted by touching keys from 0 to 9. The inputted numbers, for example 03345678, appear in order in a straight line above the keys 0–9. Touching keys ◁ or ▷ allows the cursor to the left or right, respectively, along the inputted numbers, so that the operator can correct a number if he inputs the wrong number. In FIG. 2, a power key 201 is for turning on and off the system. A present position key 202 is used to display the present position of the vehicle. A destination key 203 is used for setting and checking the destination of vehicle. A scroll key 205 is for scrolling the map displayed on the screen upwardly and downwardly as well as leftward and rightward.

Figure 4:
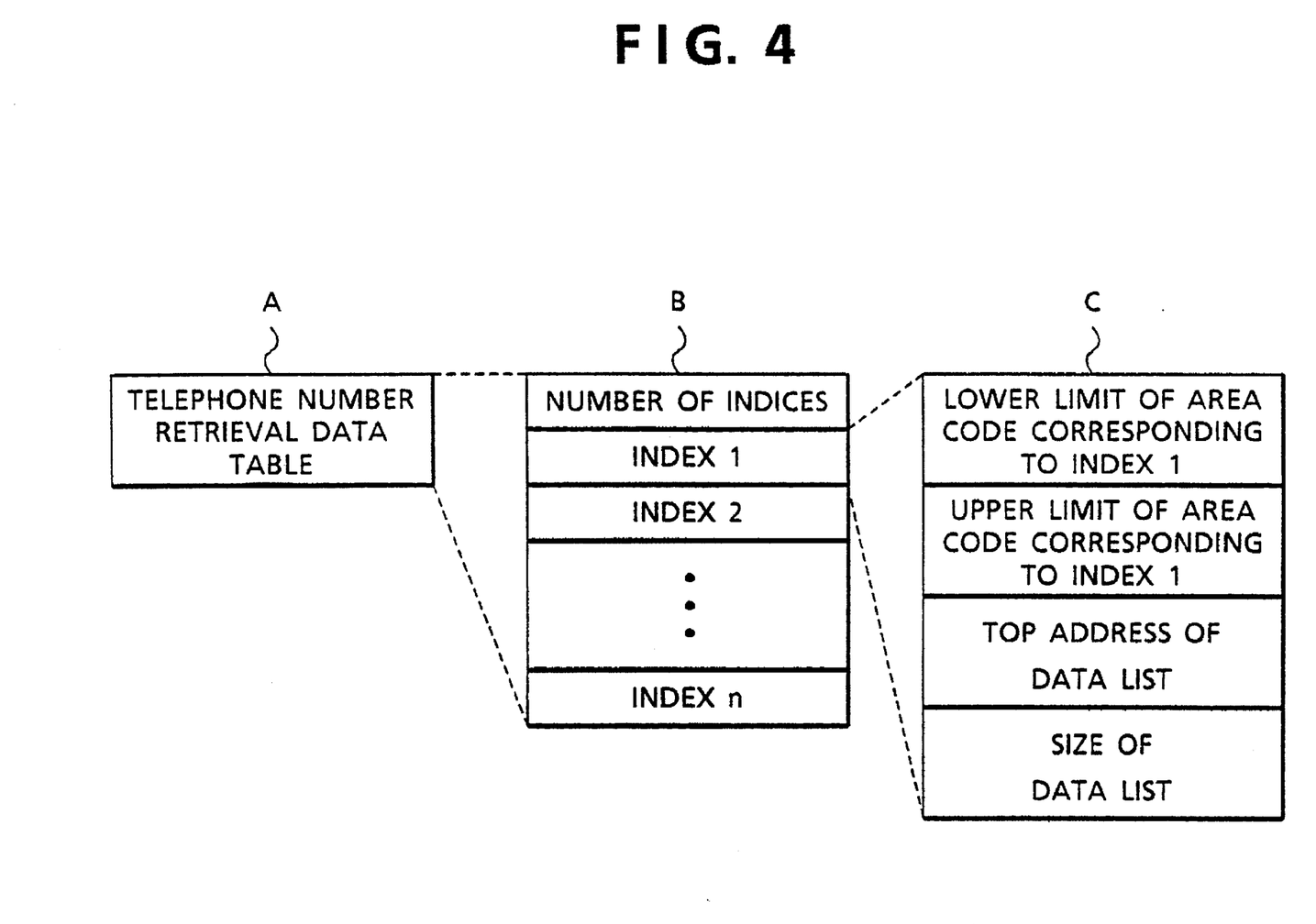
FIGS. 4 and 5 illustrate the structure of telephone number retrieval data stored in the telephone number retrieval data memory.
Figure 5:
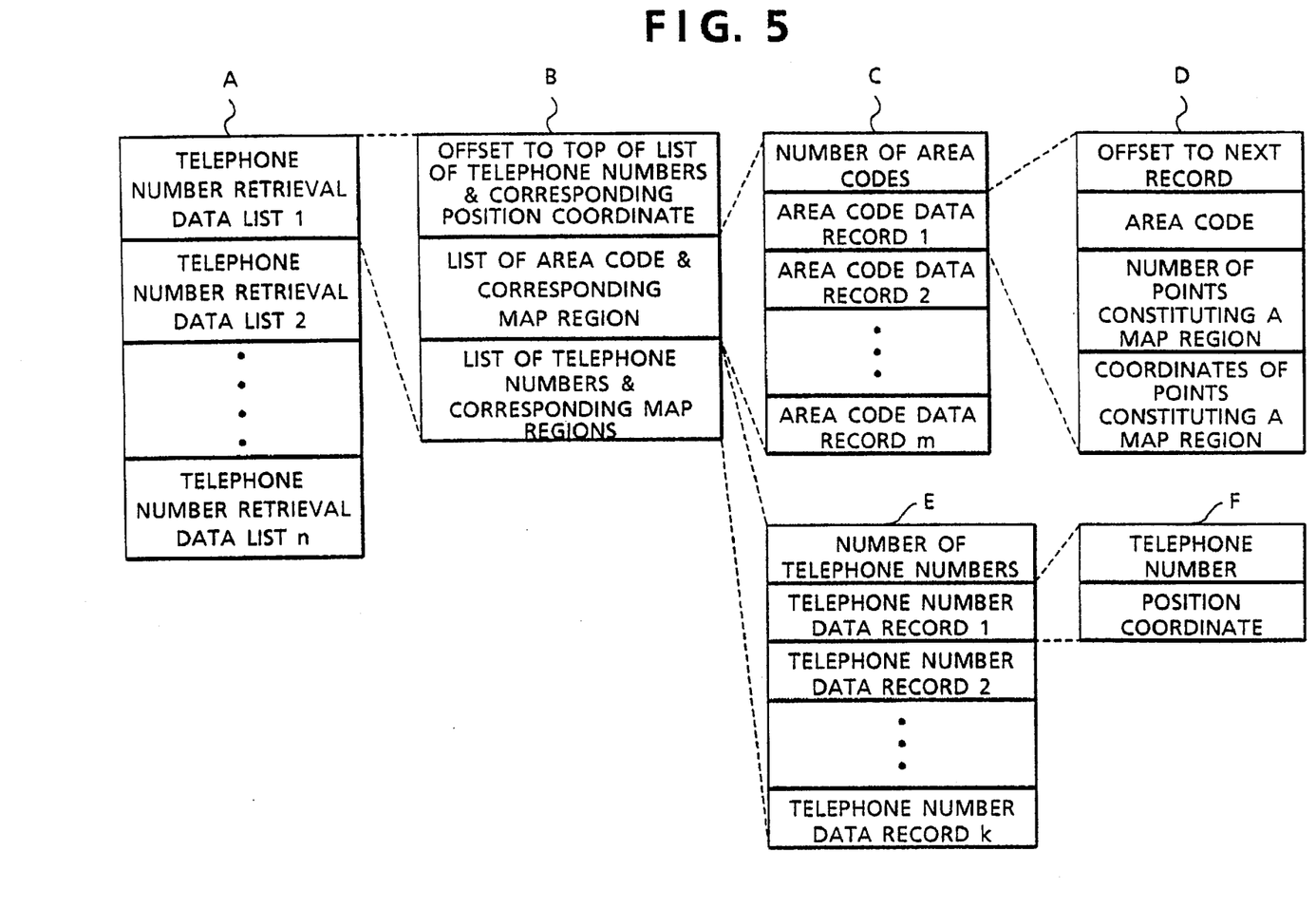

A registered-destination key 204 is used much the same way as the destination key 203. Pressing the registered-destination key 204 initiates the registration of, for example, homes, cottages, and friend's places. FIGS. 4 and 5 illustrate the structure of telephone number retrieval data stored in the telephone number retrieval data memory 40. A telephone number retrieval data table A includes a plurality of indices as shown at B each of which includes the lower limit and the upper limit of area codes of the telephone number retrieval data list, the top address of the telephone number retrieval data list, and the size of the telephone number retrieval data list. A series of telephone number retrieval data lists are depicted by A in FIG. 5. The list A includes an offset to the top of the list of telephone numbers and corresponding position coordinates, a list of area codes and corresponding map regions, and a list of telephone numbers and corresponding position coordinates depicted by B in FIG. 5. The list of area codes and corresponding map regions is depicted in detail by C in FIG. 9, and includes a plurality of area code data record(variable length). As depicted by D in FIG. 5, each of the area code data includes the offset to the next data record, area code, the number of points that constitute a map region, and a series of coordinates. The map region is an individual region such as city, ward, town, and county. The map region is represented with a polygon within which a specific city, ward, town, or county is. The polygon includes a plurality of position coordinates ranging from 50 to 100, each of which indicating a vertex of the polygon.

The list of telephone numbers and corresponding position coordinates is depicted by E in FIG. 5, and includes a plurality of area code data record(fixed length). As depicted by F in Fig. each of the area code data consists of a telephone number and corresponding position coordinate 5. The postal code retrieval data has much the same data structure as that shown in FIG. 5.

Operation

Figure 8:
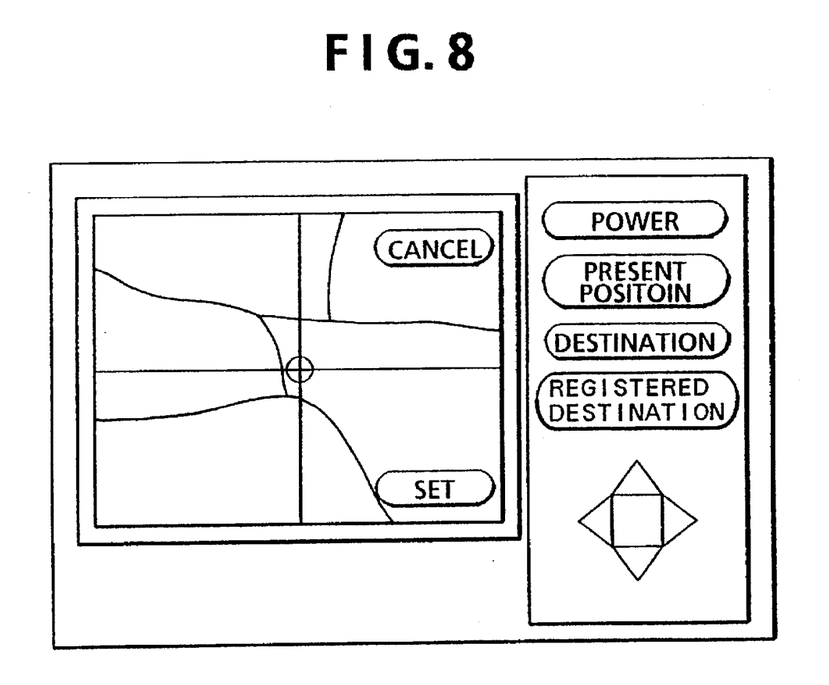
FIG. 8 shows a map displayed in the telephone number mode of the embodiment in FIG. 1.

The operation of the invention will now be described as follows:

When the present position key 202 is pressed, the present position of the vehicle is displayed on the map with a symbol indicating the present position of the vehicle. Pressing the destination key 203 brings an option menu on the screen, so that the operator is prompted to select either "INPUT" or "CONFIRM", not shown, of the destination of the vehicle. It should be noted that the screen is of a touch screen type. Upon touching "CONFIRM", a symbol indicating the destination appears on display in superposition to the map. Meanwhile, touching "INPUT" brings an option menu shown in FIG. 2 on the screen where the operator is prompted to select one of the modes of destination selection, i.e., map mode, telephone number mode, area code mode, and postal code mode. The area code mode and postal code mode are used when the exact position of a destination is unknown. These two modes help the operator quickly search for the right map that includes the destination of the vehicle, so that the operator can subsequently find out the exact point of the destination on the map by using, for example, a scroll key. FIG. 3 shows an example of selecting the destination in terms of a telephone number when "TELEPHONE NUMBER" in FIG. 2 is selected. When the operator has inputted a telephone number by sequentially touching the corresponding numbers and then pressed "SET," a map appears on display with the position coordinate of the inputted telephone number indicated by a small circle at the center of the screen on the screen as shown in FIG. 8. Upon touching "SET" on the screen, the position coordinate depicted by the small circle is set as the coordinate of the destination of the vehicle. Conversely, the pressing of "CANCEL" interrupts the registration of destination. The registration of destination using the registered-destination key 204 is effected in much the same way.

The map on display may be scrolled by operating the scroll key 205, so that the operator can bring a position coordinate near the inputted telephone number to the center of screen, and the operator can then register the position coordinate as a destination.

Operation of System Controller

Figure 6:
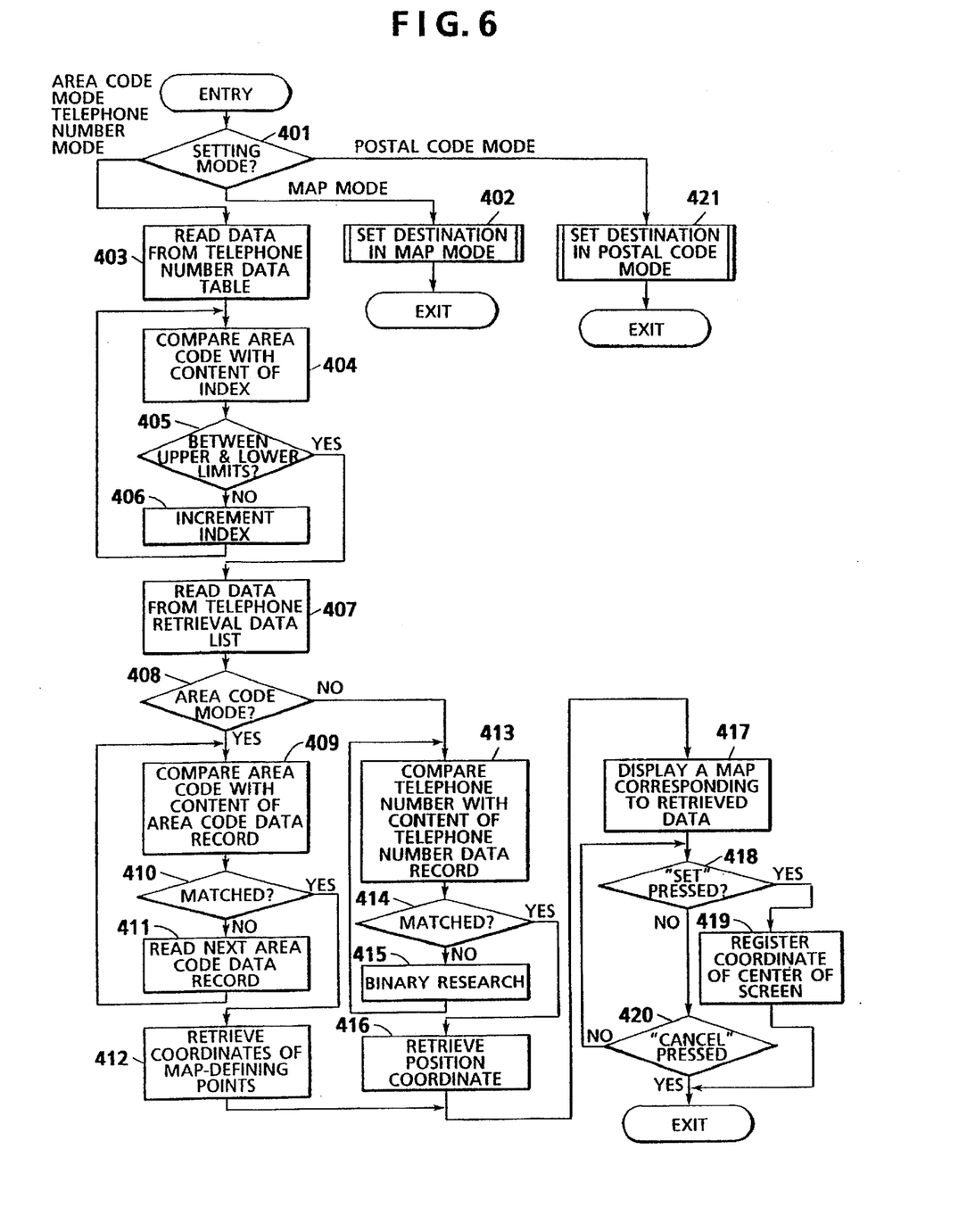
FIG. 6 is a flowchart illustrating the operation of the system controller of the embodiment in FIG. 1.

The operation of the system controller 100 when setting a destination will now be described with reference to a flowchart in FIG. 6.

A check is made to determine at step 401 which one of modes a desired destination is entered in. If the result at step 401 is "MAP," then the program proceeds to step 402 where destination selection is carried out in much the same way as the prior art apparatus. If the result at step 401 is "TELEPHONE NUMBER" or "AREA CODE," the program proceeds to step 403 where the necessary data is read from the telephone number data table as shown in FIG. 4. The program then proceeds to step 404 where the inputted area code is compared with the index content shown in FIG. 4 and subsequently a check is made at step 405 to determine whether the inputted area code is between the lower and upper limits of content of that index. If the answer at step 405 is NO, the index is incremented by one at step 406 before returning to step 404 to subsequently compare the inputted area code with the next index.

If the answer is YES at step 405, then the program jumps to step 407 where the data is read from the telephone retrieval data list of the corresponding index, and then a check is made at step 408 to determine whether the destination setting is in the area code mode. If the answer is YES at step 408, then the program proceeds to step 409 where the inputted area code is compared with the content of area code data record. Then, a check is made at step 410 to determine whether the inputted area code matches the content of the area code data record. If the result is YES at step 410, then the program jumps to step 412 where the coordinates of the points that define a map region are retrieved and then the program jumps to step 417. If the result is NO at step 410, the program proceeds to step 411 where the program reads the next area code data record and then returns to step 409.

If the answer is NO at step 408, the program proceeds to steps 413–414 where the inputted telephone number is compared with the content of the telephone number data record to determine whether the two data match each other. If the result at step 414 is NO, a binary search is performed at step 415 and then the program returns to step 413, so that the telephone number data that matches the inputted telephone number is quickly searched for. If the answer at step 414 is YES, the program jumps to step 416 where the position coordinate corresponding to the inputted telephone number is retrieved.

Figure 7:
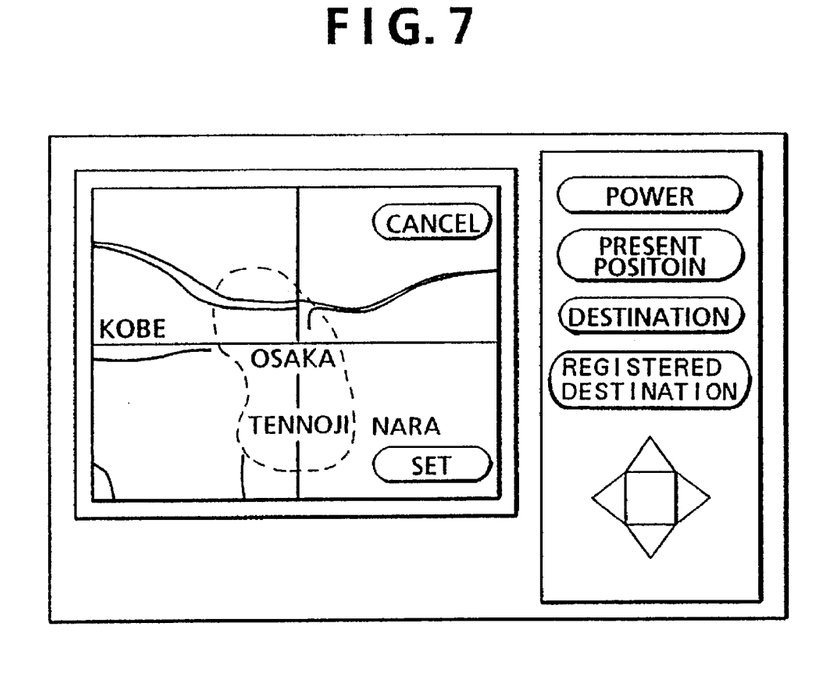
FIG. 7 shows a map displayed in the area code mode of the embodiment in FIG. 1.

At step 417, a map in accordance with the thus retrieved data is displayed on the displayer 1 as shown in FIGS. 7 and 8. The vertical and horizontal lines passing through the center of the screen form a cross cursor indicating the center of screen. FIG. 7 shows a map retrieved in the area code mode and FIG. 8 in the telephone number mode. It should be noted that a map region encircled by a dotted line is shown highlighted, if the map region is specified by information such as an area code and a postal code.

A check is made at step 418 to determine whether "SET" has been pressed; if YES, then the coordinate at the center of the screen on which the map is being displayed is registered as the coordinate of the destination, and if NO, then a check is made at step 420 to determine whether "CANCEL" has been pressed. If the result at step 420 is NO, the program returns to step 418 where a check is again made to determine whether "SET" has been pressed.

If the result at step 401 is the postal code mode, the program proceeds to step 421 where the program is carried out in much the same way as in the area code mode.

The invention being thus described, it will be obvious that the same may be varied in many ways. Since variations are not to be regarded as a departure from the spirit and scope of the invention, and all such modifications as would be obvious to one skilled in the art are intended to be included within the scope of the following claims.

What is claimed is:

1. A map displaying apparatus comprising:

first memory means for storing map data, including a plurality of map regions;

input means for inputting information, specifying a destination located in one of the plurality of map regions, said information including only a telephone area code of the destination or an entire telephone number, including area code, of the destination;

second memory means for storing first map-region-specifying data, indicating a relation between said entire telephone number and a map region in which said entire telephone number is located, and for storing second map-region-specifying data indicating a relation between said telephone area code and a map region assigned to said telephone area code;

map-region-retrieving means for retrieving from said first memory means, the map region in which said telephone number is located according to said first map-region-specifying data when said entire telephone number is input, and for retrieving from said first memory means, a map region assigned to said telephone area code according to said second map-region-specifying data when only said telephone area code is input; and display means for displaying the map region in which said entire telephone number is located, retrieved from said first memory means according to said first map-region-specifying data, with a location corresponding to said entire telephone number superimposed onto the map region in which said entire telephone number is located when said entire telephone number is input, and for displaying the map region assigned to said telephone area code and adjacent map regions and highlighting the map region assigned to said telephone area code according to said second map-region-specifying data, when only said telephone area code is input.

2. The map displaying apparatus of claim 1, wherein a location indicated by said entire telephone number is located at a center of a display.

3. The map displaying apparatus of claim 1, wherein the map region in which said entire telephone number is located and the map region including said telephone area code are displayed on a touch sensitive screen and said entire telephone number and said telephone area code are input via the touch sensitive screen.

4. A map displaying apparatus comprising:

first memory means for storing map data, including a plurality of map regions;

input means for inputting postal zip code information, specifying a destination region located in one of the plurality of map regions;

second memory means for storing map-region-specifying data, indicating a relation between the postal zip code information and a map region assigned to the postal zip code;

map-region-retrieving means for retrieving from said first memory means, the map region assigned to the postal zip code and adjacent map regions according to said map-region-specifying data; and display means for displaying the map region assigned to the postal zip code and adjacent map regions, retrieved from said first memory means according to said map-region-specifying data and highlighting the map region assigned to said postal zip code.

* * * * *